Nov. 4, 1952    R. W. BAILEY ET AL    2,616,324
NUT DRIVING MACHINE
Filed June 30, 1949    10 Sheets-Sheet 6
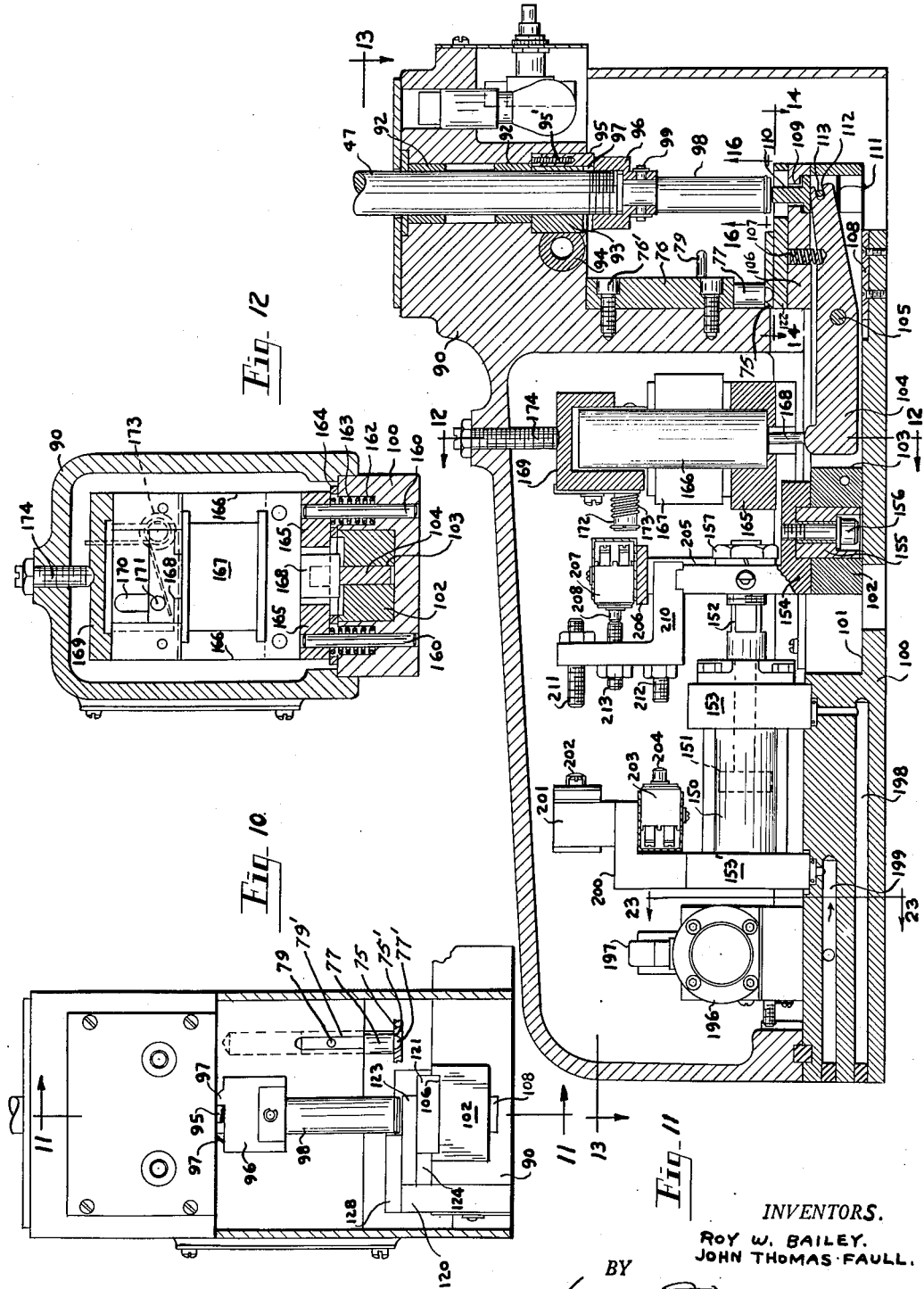
INVENTORS.
ROY W. BAILEY.
JOHN THOMAS FAULL.
BY
Samuel Weisman
ATTORNEY.

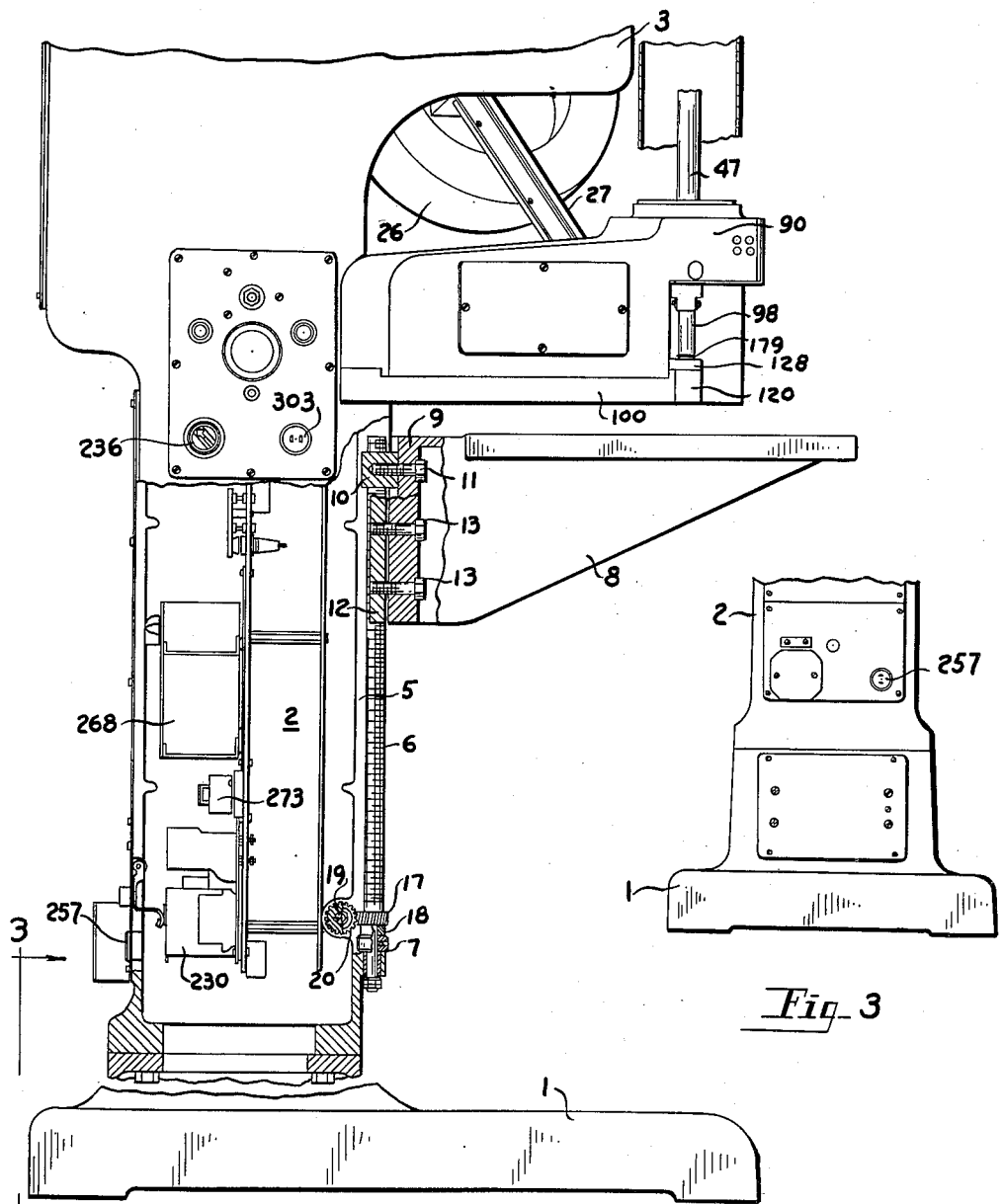
Fig. 2
Fig. 3
INVENTORS.
ROY W. BAILEY.
JOHN THOMAS FAULL
BY
ATTORNEY.

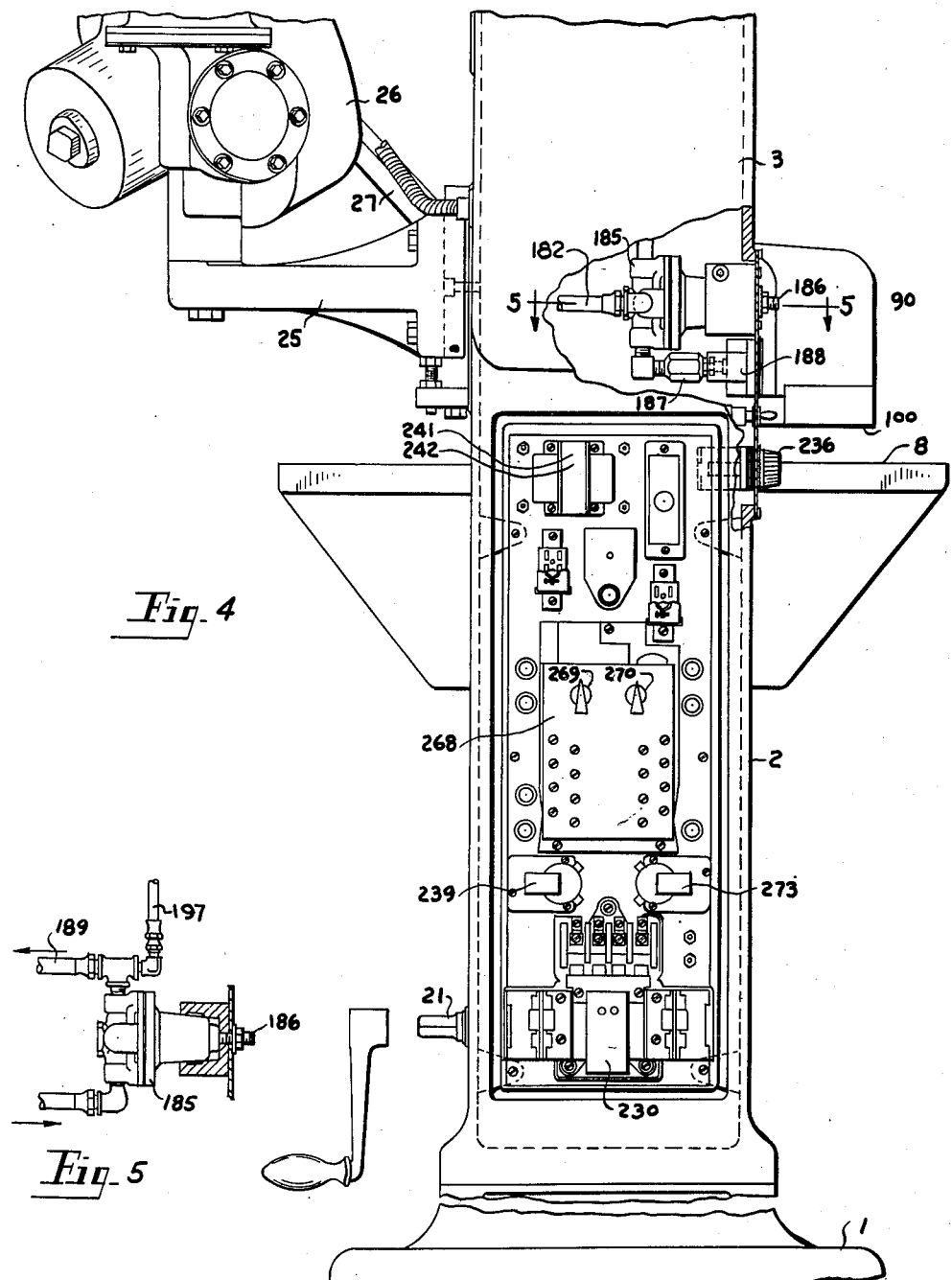

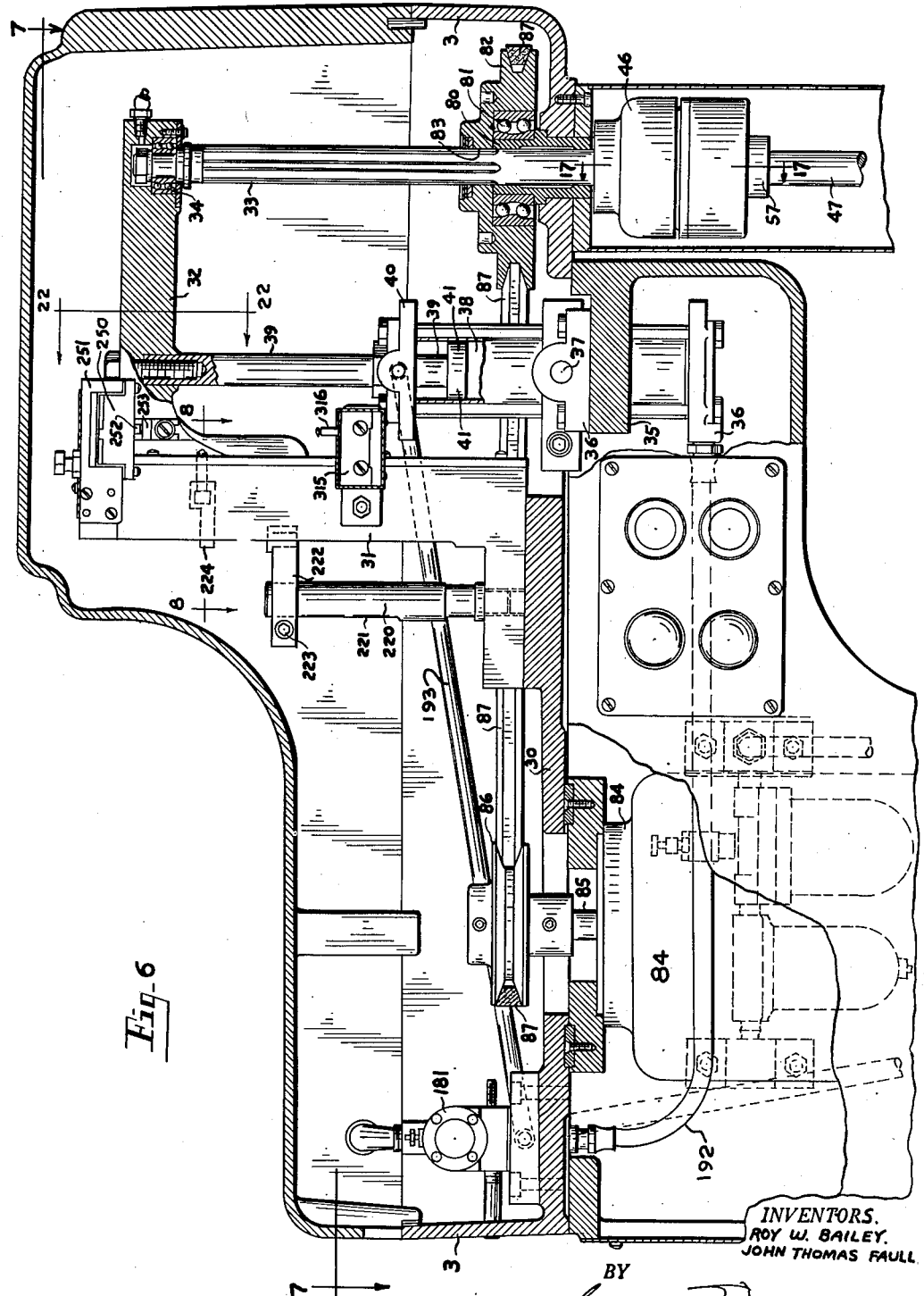

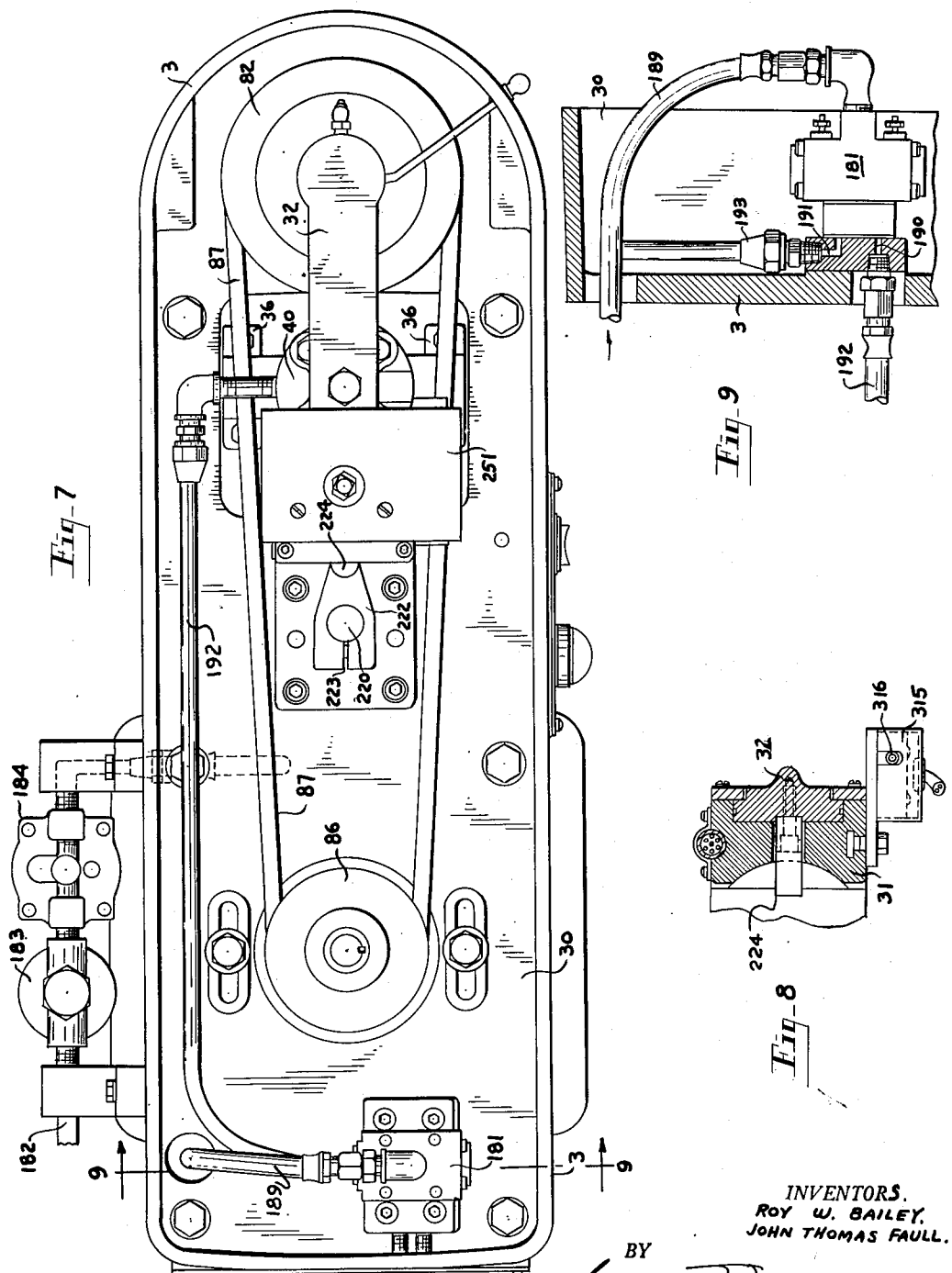

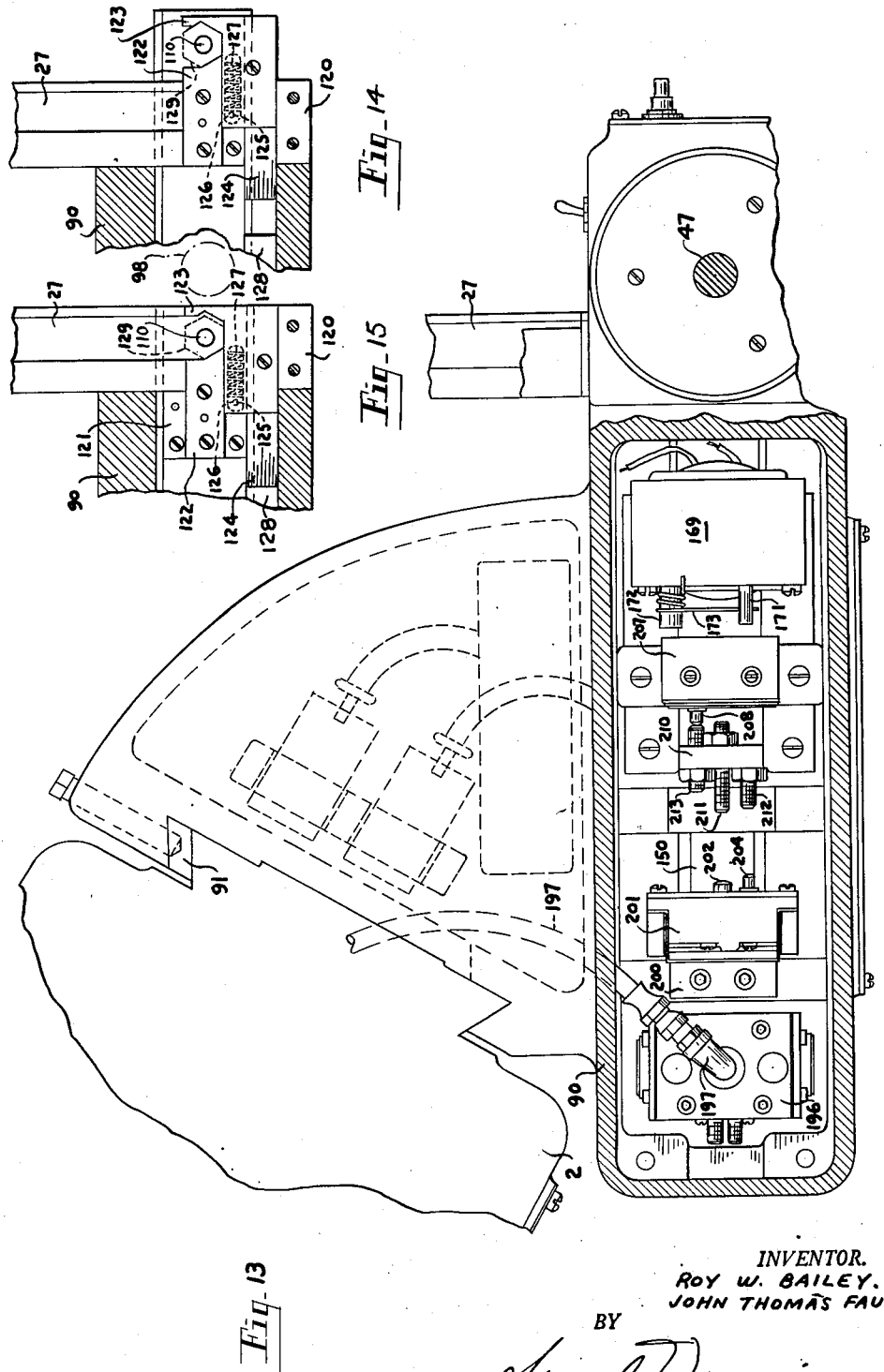

Nov. 4, 1952   R. W. BAILEY ET AL   2,616,324
NUT DRIVING MACHINE
Filed June 30, 1949   10 Sheets-Sheet 8

INVENTORS.
ROY W. BAILEY.
JOHN THOMAS FAULL.
BY
Samuel Weisman
ATTORNEY.

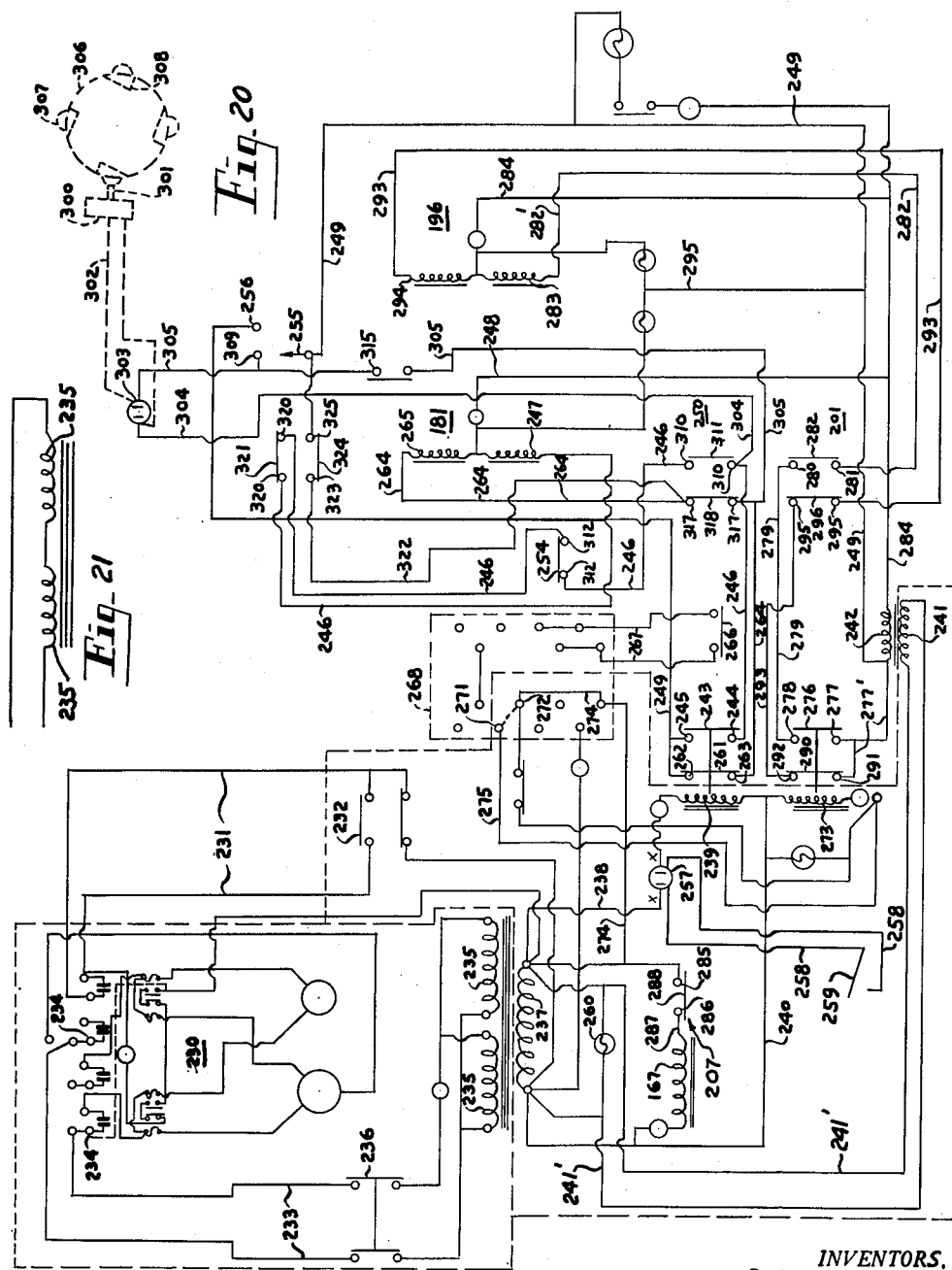

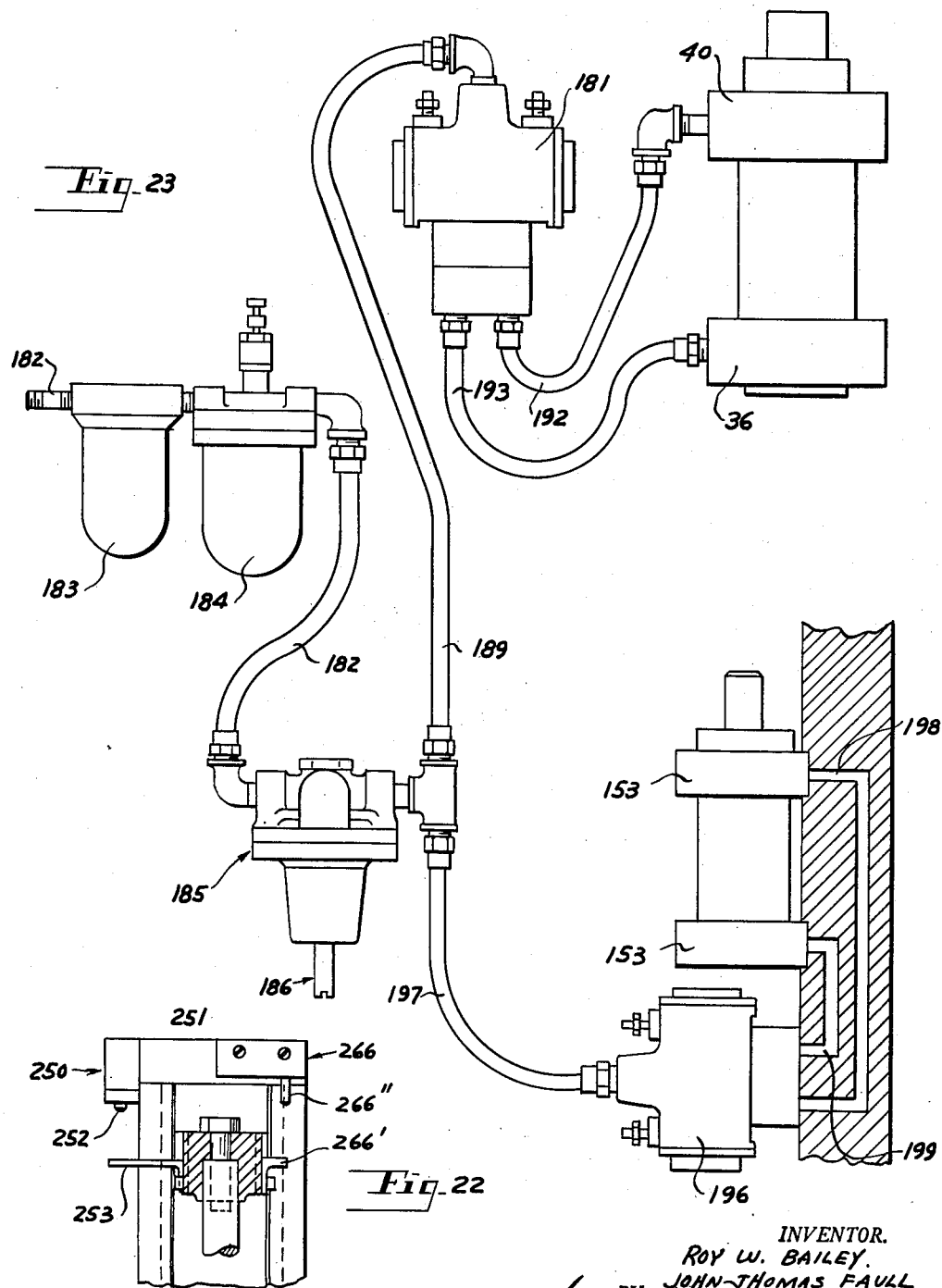

Patented Nov. 4, 1952

2,616,324

UNITED STATES PATENT OFFICE 2,616,324

NUT DRIVING MACHINE

Roy W. Bailey and John T. Faull, Detroit, Mich., assignors to Detroit Power Screwdriver Company, Detroit, Mich., a corporation of Michigan Application June 30, 1949, Serial No. 102,343

14 Claims. (Cl. 81—54)

This application is a continuation in part of our co-pending application Serial No. 554,608, filed September 18, 1944, now Patent No. 2,509,123 of May 23, 1950.

The invention relates to a nut driving machine in which a nut is delivered mechanically into a rotating wrench which is then brought against a piece on which the nut is to be screwed. More particularly, the nut is picked up from a track or similar supply by means of a pair of slidable jaws. The jaws are then moved to a position that brings the nut into axial alinement with the wrench, and an injector mechanism then transfers the nut from the jaws to the wrench. The wrench, which is carried by a spindle, is then brought against the work.

In both this application and the patent, the movements are automatic and timed. The earlier application discloses mechanical means for controlling the movements, and in this connection it is one of the objects of the present invention to obtain more accurate, variable and reliable control by electrical means. The reciprocatory movement of the sliding jaws and the wrench spindle, however, are effected by fluid cylinders which in turn are controlled by electrically operated valves.

At each end position of the slidable jaws and spindle a limit switch is engaged for initiating the succeeding movement. However, a dwell is required for the application of the nut to the work by means of the wrench, and the required dwell varies according to the length of the nut. In order to meet this requirement, an electronic timing device is incorporated in the system and is connected in such a manner as to function in accurate cooperation with the other motion controls. The timer is adjustable for the purpose previously set forth.

It is evident from the foregoing that the operation of the machine is cyclic. A further object of the invention is to provide a system that permits stopping the cycle at any point in case a defective part is discovered and then resuming the operation at the start of a cycle, without disturbing the normal sequence.

A further object of the invention is to provide a machine that can be operated either in separate unit cycles or in automatically succeeding cycles. For certain classes of work it is preferable to have the machine stop at the completion of each cycle, requiring the operator to actuate a switch to start a new cycle. This is known as unit operation. In other classes of work the machine may run without interruption, or without requiring intervention by the operator, from each cycle to the next cycle. Actually, the operator-controlled switch is replaced by a timed, mechanical switch operating device which also brings the work pieces successively under the wrench to receive the nuts. This automatic sequence of operation, however, requires a modified circuit. The invention embodies means whereby the proper circuit automatically comes into service by the use of either the personally operated switch or the mechanically operated switch.

The invention is fully disclosed by way of example in the following description and in the accompanying drawings in which:

Figure 2 is a side elevation, partly in section;

Figure 3 is an elevation on the line 3—3 of Figure 2;

Figure 4 is a rear elevation with the electrical access panel removed;

Figure 5 is a section on the line 5—5 of Figure 4;

Figure 6 is a vertical section of the upper portion of the machine in a plane parallel to that of Figure 2;

Figure 7 is a section on the line 7—7 of Figure 6;

Figure 8 is a section on the line 8—8 of Figure 6;

Figure 9 is a section on the line 9—9 of Figure 7;

Figure 10 is a detail front elevation, partly in section;

Figure 11 is a section on the line 11—11 of Figure 10;

Figure 12 is a section on the line 12—12 of Figure 11;

Figure 13 is a section on the line 13—13 of Figure 11;

Figure 14 is a section on the line 14—14 of Figure 11;

Figure 15 is a similar view, showing the jaws retracted;

Figure 20 is a wiring diagram;

Figure 21 is a modified detail thereof;

Figure 22 is a section on the line 22—22 of Figure 6, and

Figure 23 is a section on the line 23—23 of Figure 11, showing also the fluid system diagrammatically for clearer illustration.

Reference to these views will now be made by use of like characters which are employed to designate corresponding parts throughout.

Figure 1:
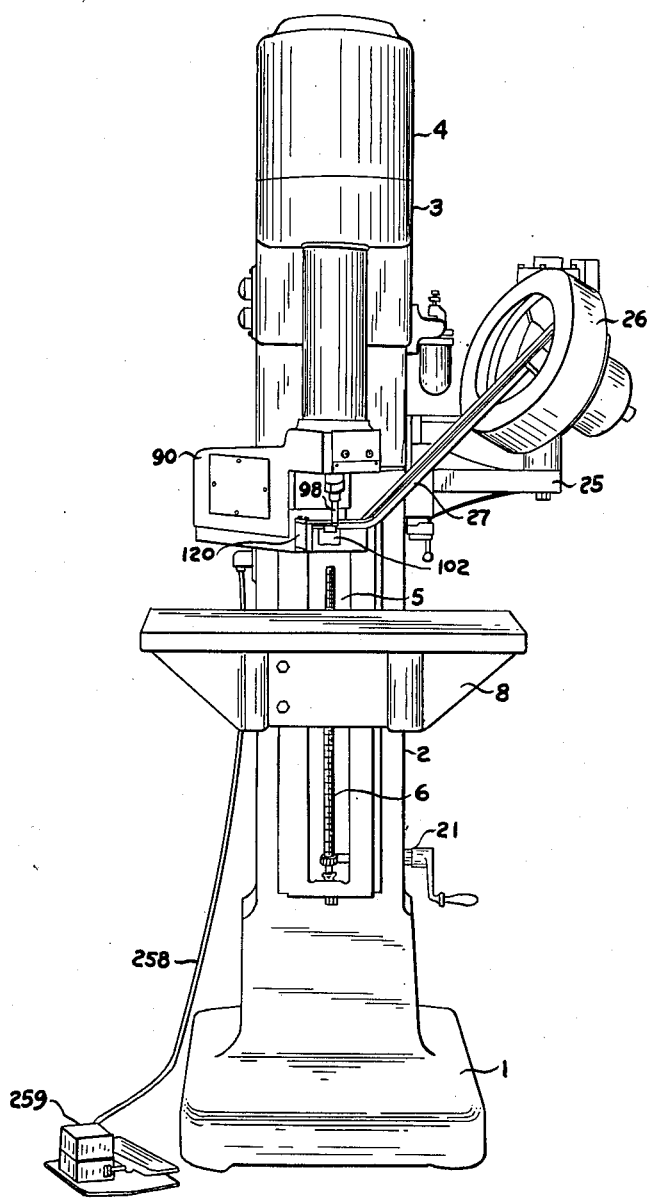
Figure 1 is a perspective view of the machine taken from the front.
Figure 16:
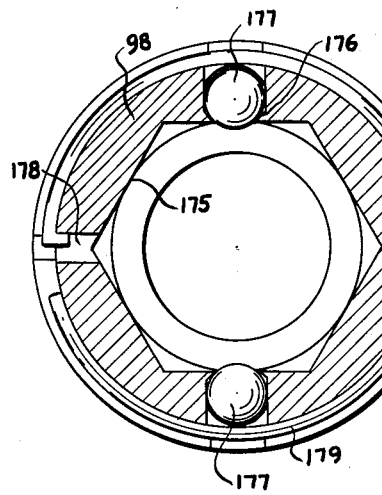
Figure 16 is a section on the line 16—16 of Figure 11.
Figure 17:
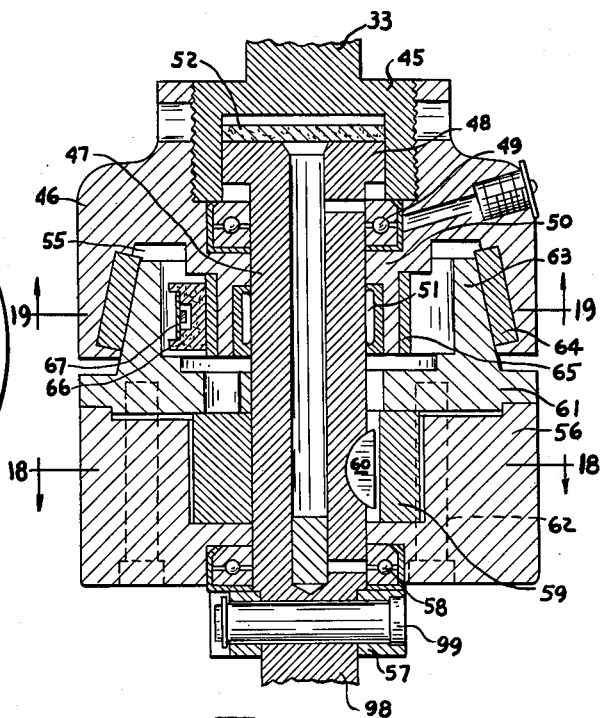
Figure 17 is a section on the line 17—17 of Figure 6.
Figure 18:
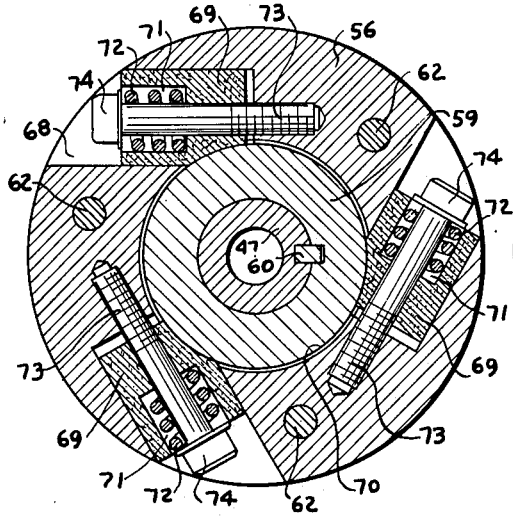
Figure 18 is a section on the line 18—18 of Figure 17.
Figure 19:
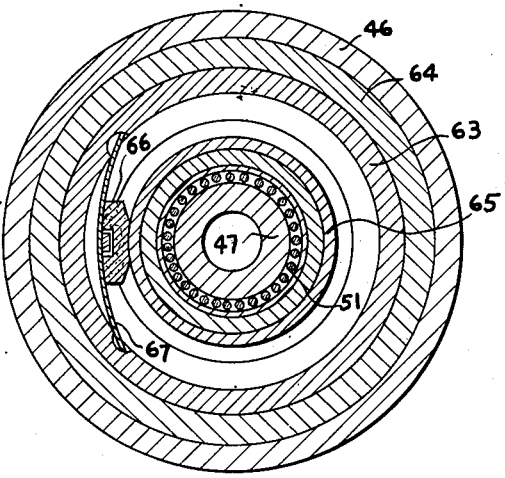
Figure 19 is a section on the line 19—19 of Figure 17.

In Figure 1 is shown a machine base 1 on which is formed or built a column 2 in any suitable manner. At the upper end of the column is provided a head or top arm 3 fitted with a cover 4.

The column is formed with a vertical slot 5 on which is mounted a vertical screw 6. The lower end of the screw is held in a suitable bearing 7, and the upper end may be similarly mounted. The screw supports a table 8 having a vertical wall 9 adjacent to the slot 5. A table adjusting nut 10 is mounted on the screw 6 and fastened to the wall 9 by a suitable number of screws 11.

The wall 9 also carries a gib or clamp 12 held by the upper and lower screws 13. When the table is to be adjusted by turning the screw 6, the screws 13 are turned to loosen the gib 12. The lower end of the screw carries a spiral gear 17 held from the bearing 7 by a spacer collar 18. A horizontal shaft 19 journalled in the housing carries a spiral gear 20 meshing with the gear 17. The outer end 21 of the shaft 19 is suitably shaped for engagement by a crank for rotating the screw 6 and adjusting the elevation of the table.

A bracket 25 mounted on the column 2 supports a rotary hopper 26 adapted to feed nuts into a track 27 which delivers them to a location above the table 8 and to a power driven socket wrench as will presently be described. The hopper and track are fully disclosed in United States Patent No. 2,060,182 of November 10, 1936 and require no detailed description here.

On a shelf 30 mounted in the top arm 3 is secured a vertical track 31 for adjustably supporting various parts as will presently appear. In a side of the member 31 is slidably mounted an arm 32 from which is suspended an upper spindle 33 by means of a suitable bearing 34. A ledge 35 beneath the shelf 30 carries a pair of bearings 36 which receive the trunnion 37 of a vertical cylinder 38. A piston rod 39 fixed to the arm 32 passes through the upper cylinder head 40 to the piston 41 within the cylinder.

Beneath the top arm 3, the lower end of the upper spindle is enlarged and threaded at 45 to receive an upper clutch housing 46. The lower spindle 47 is suspended by a head 48 on its upper end resting on a thrust bearing 49 which lies on a shoulder 50 formed in the housing 46. The housing also contains a needle bearing 51 engaging the upper portion of the lower spindle. A felt retainer 52 for oil is inserted in the head 48.

The bottom of the housing 46 is formed with a conical recess 55. At a lower position on the lower spindle is mounted another housing 56 resting on a stop collar 57 secured on the lower spindle, with a thrust bearing 58 inserted in the lower housing to engage the collar. Within the housing 56 is a clutch friction collar 59 keyed at 60 to the lower spindle for a purpose that will presently appear. Upon the housing 56 is a clutch member 61 secured by studs 62. The member 61 is formed with a conical clutch ring 63 received in the cavity 55.

A hard steel sleeve 65 is pressed on the lower end of the member 46 at the inner wall of the recess 55. The sleeve is engaged by a fiber friction block 66, and is engaged by a flat compressed spring 67 firmly engaging or secured to the clutch member 63. This constitutes a light friction drive between the member 46 and the member 61.

The member 56 is formed with a series of recesses 68 at suitable intervals. In each recess is placed a fibre friction plug 69 which is modified to form an arcuate surface 70 engaging the periphery of the friction collar 59. The plugs are counterbored to form a cavity 71 in which is seated a coil spring 72. A stud 73 is passed through each recess and is screwed into the body of the member 56. One end of the spring bears against the friction plug and the other end against the head 74 of the stud, whereby the friction plugs are held edgewise in frictional engagement with the clutch friction collar 59.

Through the bottom of the arm 3 is passed a sleeve 80 in which the upper spindle 33 slides and rotates. The sleeve 80 carries a ball bearing 81 for a pulley 82 which is splined at 83 on the spindle 33. Beneath the shelf 30 is supported an electric motor 84 with a vertical shaft 85 carrying another pulley 86. These two pulleys are in the same horizontal plane and are joined by a V-belt 87.

The rotating upper spindle 33 imparts only a light but positive drive to the lower spindle 47 through the block 66 and spring 67, for a purpose that will presently be described. When the lower spindle meets resistance to downward movement, the conical clutch engages through the friction ring 64 and drives against the load. A laterally extending housing 90 is secured to the column 2 and is vertically adjustable thereon by a gib 91 (Figure 13). This housing contains mechanism for transferring nuts from the track 27 into a socket wrench carried by the lower spindle 47. The housing contains bearings 92 that receive the lower spindle, as shown in Figure 11.

The lower spindle 47 also passes through a bushing 93 secured in the housing 90 by a plug 94.

In the bushing 93 is axially mounted a dog or pawl 95 backed by a spring 95' for a limited yielding movement inward.

On the lower end of the spindle 47 is secured a complementary stop and adapter 96 formed on its upper end with a pair of diametrically opposed teeth 97 for selectively engaging the dog 95. A bit or wrench 98 for receiving nuts is held in the adapter by a pin 99. The track 27 terminates at a point adjacent to the center line of the spindle, as shown in dotted lines in Figure 15, and the pieces are moved from the track laterally to the center line of the spindle and beneath the wrench by means that will now be described.

The floor 100 of the housing 90 is formed with a longitudinal recess 101 (Figure 11) in which is mounted a slide 102. The slide is also formed with a longitudinal slot 103 in which is mounted an injector lever 104, in the nature of a rocker arm, on a pivot pin 105. A guide plate 106 is fastened upon the slide over the forward end of the lever 104. An interposed coil spring 107 tends to hold the arm downward. Beneath this arm a removable wear plate 108 is fastened to the floor 100.

The guide plate 106 is formed with a shouldered opening 109 in which is slidably mounted a shouldered injector pin 110. Beneath the plate 106, the pin 110 is slotted at 111 to receive the forward end of the lever 104. This end is forked at 112 to receive a cross pin 113 that bridges the slot 111.

To the housing 90 is secured a vertical mounting block 120 opposite the discharge end of the track 27, for a purpose that will presently appear.

On the plate 106 is located and secured a mounting plate 121 for a longitudinally extending jaw 122 fastened to the plate 106 and adapted to traverse the discharge end of the track on movement of the slide 102. A complementary jaw 123 opposing the jaw 122 is independently mounted and carries a finger 124 lying parallel to the slide 102. The jaw 123 also carries a pin 125 extending upwardly into a slot 126 cut lengthwise in the plate 121. A coil spring 127 bears against the pin 125 at one end of the slot and tends to move the jaw 123 toward the jaw 122. A retaining plate 128 secured horizontally on the upper end of the block 120 holds down the finger 124. The plate 121 is also formed with a hole 129 that registers with the hole 109 for the injector pin 110.

For actuating the slide 102, a cylinder 150 is mounted on the floor 100 behind the cavity 101. The cylinder contains a horizontally movable piston 151 from which a piston rod 152 extends through the forward head 153. A right angular bracket 154 is firmly secured to the slide by the plug 155 and a stud 156. The piston rod is secured to the vertical leg of the bracket by suitable fastening means 157.

When the slide is in the retracted position, the space between the jaws 122 and 123 is in line with the track 27, as shown in Figure 15. However, the jaw 123 is held slightly forward by the engagement of the finger 124 with a fixed stop 158 and the housing to provide ample space for a polygonal nut to enter. The spring 127 is thereby slightly compressed, and when the slide assembly moves forward, the spring draws the jaw 123 against the adjacent faces of the nut. At the end of the forward movement, the jaws and the nut are coaxial with the bit 98, and the lever 104 is actuated to transfer the nut to the bit.

A solenoid is provided for the latter purpose.

A pair of pins 160 (Figure 12) are slidably mounted in the base 100 at opposite sides of the slide 102 at the rear end of the lever 104. The base is counterbored from the top at 162 to receive coil springs 163 surrounding the pins. The springs and pins pass through a pair of hold down gibs 164 secured upon the base 100 and overlapping the slide 102. The upper ends of the pins are press fitted into a saddle piece 165.

In the saddle piece is secured a set of vertical laminations 166 in which is set a winding 167. A vertically movable armature or plunger 168 is mounted in the winding and is adapted to bear upon the rear end of the lever 104. A yoke 169 is secured over the upper ends of the laminations and is formed with a vertical slot 170 which receives a guide pin 171 extending from the upper end of the plunger 168. The yoke 169 carries a laterally extending pin 172 on which is coiled a wire spring 173 having one end bearing upward on the pin 171 (Figure 12) to hold the plunger normally in its elevated position. A screw 174 at the top of the housing 90 bears upon the yoke 169 to hold the solenoid assembly downward against the springs 163. By means of this screw, the springs 163 can be permitted to elevate the solenoid assembly for regulating the effective stroke of the plunger 168 on the lever 104 for various sizes of nuts, without disturbing the actual stroke of the plunger and without overheating the solenoid by a reduced actual stroke.

The timing of the slide and injector mechanisms is described below. For the present, however, it will be seen that the slide moves a nut from the track 27 to a position below the bit 98, and the pin 110 then transfers the nut from the jaws into the bit. The bits are interchangeable, and the lower end of the selected bit is recessed at 175 according to the nut being handled. At the sides of the recess are formed seats 176 which receive balls 177 extending somewhat into the recess. The outer wall of the bit is grooved at 178 to receive a wire spring 179 for holding the balls on their seats. The nut is injected while the bit is held stationary by the interengagement of the dogs 95, 96 and the recess 175 alined with the nut. The slide and injector are then withdrawn, leaving a bare space for the loaded bit to be moved down to the work.

The track 27 has a removable transparent cover 75 (Figures 10 and 11) to hold the nuts flat and keep them clean. A plate 76 is fastened to the housing 90 by studs 76' and contains a slidable pin 77. The pin has a reduced end 77' adapted to lock in a hole 75' in the plate 75. A finger 79 extends internally from the pin 77 through a slot 79' in the plate 76. By lifting the finger, the pin is released from the hole 75' to permit removal of the plate 75 when access to the track is desired.

With reference again to the operation of the clutch and bit, the interengaging members 95 and 96 retain the bit 98 in the same radial or angular position whenever the lower spindle is stopped. Thus, the socket 175 always has the same relation, in the stationary position, to a given fixed radius and is always properly alined for insertion of a nut.

On the downward or nut-driving stroke, the lower spindle is first driven lightly by the friction member 66 and is accelerated to a substantial speed before the nut engages the piece on which it is to be screwed. This action avoids stripping of the threads, which would be likely to occur if the nut started to engage the work from zero or low speed of rotation. When this engagement occurs, there is resistance to continued downward movement of the driven spindle, and this resistance or load causes engagement of the main driving clutch 63, 64.

On the retraction of the spindle after the nut has been driven, the main clutch disengages by the weight of the driven spindle. The friction member 66 is still operative on the driven spindle and assures rotation of the latter to make a full engagement of one of the dogs 96 with the non-rotating dog 95 for the properly alined loading position of the bit, as previously set forth.

The piston 41 in the cylinder 38 for raising and lowering the spindle is controlled by a conventional solenoid two-way valve 181 mounted on the shelf 30. The source of compressed air or other pressure fluid is indicated by the line 182 which passes through a filter 183 and lubricator 184 to a pressure regulator 185 (Figure 4) having an adjusting knob 186 at the face of the machine. A branch 187 extends from the regulator to a pressure gauge 188. A line 189 (Figure 5) connects the regulator 185 to the inlet of the valve 181. The valve has two outlets 190 and 191 (Figure 9) connected respectively by pipes 192 and 193 (Figure 6) to the lower and upper cylinder heads 36 and 40. The valve is constructed to exhaust one of the pipes while charging the other. Since such construction is well known in the art, it is not illustrated or described in detail. The valve is set in either position by charging the corresponding solenoid therein, and the timing mechanism for this purpose is described below.

The piston 151 for the slide is operated by a similar solenoid valve 196 (Figures 11 and 13) on the rear end of the floor 100. This valve receives air from the regulator through a line 197. The two outlets of the valves are connected to the cylinder heads 153 and 153' by passages 198 and 199 formed in the base 100. This valve is actuated and exhausted in the same manner as the valve 181.

Before proceeding with a detailed description of the electrical system, some of the switches installed on the machine will be described. On the cylinder head 153' is mounted a bracket 200 (Figure 11) carrying a switch 201 having a forwardly directed pushbutton 202. This switch controls the solenoid valve 196 for the slide 102. On the same bracket and in a lower position is attached a micro switch 203 with a forwardly directed pushbutton 204, for controlling the valve 181 of the spindle cylinder 38.

At opposite sides of the recess 101, posts 205 are secured to the members 164 and bridged at the top by a flatpiece 206. On this member is mounted another micro switch 207 (Figure 11) having its pushbutton 208 directed rearwardly. This switch controls the solenoid 165—170.

On the bracket 154 is mounted another right angular bracket 210 having its vertical leg lying between the switch 207 and the switches 201 and 203. This leg carries three threaded fingers or screws 211, 212 and 213 alined respectively with the pushbuttons 202, 204 and 208 for actuating the corresponding switches at the terminal positions of the slide.

On the floor 30 or on the base of the slide bracket 31 is fixed a vertical post 220 (Figure 6) formed with a flat 221. On the post is adjustably mounted a horizontal arm 222 by means of a set screw 223 engaging the flat. To the arm 32 is secured a finger 224 adapted to engage the arm 222 on the down stroke. The arm is an adjustable downward stop for the spindle stroke.

The motor 84 for driving the spindle is started by a conventional starting switch or magnetic contactor 230 (Figure 20) which is known in the art and will therefore not be described in detail. The hopper 26 is geared to the motor 84, and this also is not shown since it is conventional. One of the circuits 231 of the starter contains a manual button switch 232 which is exposed on one of the outer surfaces of the machine housing.

The power circuit 233 is connected to the power source through terminals 234 in the starter 230. This circuit contains a split primary 235 which is connected in parallel for 220 volts or in series for 440 volts as shown in Figure 20. The circuit also contains a double-throw manual switch 236 which is preferably closed before the switch 232.

One end of the secondary winding 237 is connected by a conductor 238 to one end of a solenoid 239 which is returned by a conductor 240 to the other end of the secondary. Across the secondary 237 is connected another primary 241 which energizes a secondary 242 connected to the solenoid valves as will presently be shown. Conductors 241' form the connection between the secondary 237 and primary 241.

The energized solenoid 239 closes a switch blade 243 against contacts 244 and 245. From the contact 244 a conductor 246 is connected to that solenoid 247 of the spindle valve 181 which brings the spindle down. The circuit is continued by a conductor 248 to one end of the secondary 242, and the other end of the secondary is returned by a conductor 249 to the contact 245, thereby completing a circuit through the solenoid 247.

The spindle starts downward from its top position in which a limit switch 250 in conductor 246 is closed. This switch is fixed to the top of the bracket 31 by a clamp 251 and has a downwardly extending button 252 engageable by a striker 253 on the arm 32. The conductor 246 also contains a safety switch 254 which is normally closed and opens under special conditions presently to be described. The conductor 249 contains a manual two-way switch 255 which at this time is closed against a contact 256 in this conductor.

The conductor 238 contains a circuit-breaking receptacle 257 which must be bridged in order to complete the circuit to the solenoid 239. It is bridged by an inserted conductor 258 containing a pedal switch 259. It is now evident that the described circuit is controlled by the foot operation of the pedal switch 259. This will be termed unit operation as distinguished from automatic sequential operation through another circuit which will be described. Across the secondary 237 is connected a red light 260 to indicate current flowing in the transformer.

When the spindle comes down, the foot is lifted off the pedal switch 259 to de-energize the solenoid 239. Attached to the switch blade 243 is another blade 261 normally closed against contacts 262 and 263. Conductor 249 extends to contact 262. Contact 263 is joined by a conductor 264 to the "up" solenoid 265 of the spindle valve 181. The circuit is completed by conductor 248 from solenoid 265 to the source 242 and by conductor 249 to the contact 262 by the path previously described.

At the top of the upstroke of the spindle, a switch 266 (Figures 20 and 22) is closed by a striker 266'' on the arm 32 engaging the switch button 266''. This switch is wired at 267 to a conventional electronic timer 268 mounted on the machine and closes a circuit through the timer. The timer has two knobs 269 and 270, one for setting the timer in minutes and the other in fractions of a minute. A pair of contacts 271 and 272 in the timer become joined for closing a circuit through a solenoid 273 in series with the solenoid 239 and connected at one end to conductor 240. Current flows from the source 237 through a conductor 274 to contact 272 and from contact 271 through a conductor 275 to the other end of solenoid 273, returning by conductor 240 to the source 237.

Adjacent to solenoid 273 is a switch blade 276 normally spaced from a pair of contacts 277 and 278 and drawn into engagement therewith by the energized solenoid. Contact 277 is connected at 277' to one end of the secondary 242. The terminal 278 is connected by a wire 279 to a terminal 280 of the switch 201. The terminals 280 and 281 of the switch are closed by the arm 282 since the slide is now in the "in" or withdrawn position with the finger 211 pushing on the button 202. The terminal 281 is connected by a wire 282 to the "out" solenoid 283 of the slide-operating valve 196 and this solenoid is returned by a conductor 284 to the source 242.

The slide 102 is thus advanced to carry a nut from the track to a position below the spindle. The timer 268 determines the length of time that the slide will remain in its forward position. In this position the switch 207 is closed by engagement of its button 208 by the finger 213.

One of the terminals 285 of the switch 207 is joined to conductor 274 and thus to the source 237. The other terminal 286 is connected by a wire 287 to one end of the injector operating solenoid 167, and the other end of the latter is connected into conductor 240 to complete the circuit on closing of the blade 288.

The energized solenoid 167 depresses the plunger 168 to rock the lever 104, thus elevating the injector pin 110 and driving the nut into the socket wrench 98. The alinement of the wrench and the detailed operation of the spindle are described hereinafter.

The timer has been adjusted to allow sufficient time for injection of the nut into the socket wrench, and when the timer circuit opens, it de-energizes the solenoid 273 and opens the switch 276—278. The blade 276 carries another blade 290 normally closed against a pair of contacts 291 and 292. The conductor 277' extends to contact 291. The contact 292 is connected by a conductor 293 to the "in" solenoid 294 of the slide-operating valve 196. The other end of this solenoid is joined to conductor 284 which completes a circuit to the source 242. The slide is thus returned to the "in" position and takes a nut from the track.

It will be noted that conductor 293 of the "in" circuit contains a pair of contacts 295 normally closed by a blade 296 attached to the blade 282 and incorporated in the switch 201. At the "in" position of the slide, the "in" circuit is opened at the contacts 295 and the "out" circuit is momentarily closed by the blade 282 as already described. Although the contacts 295 are again closed as soon as the slide starts forward, the flow of current in conductor 293 requires closing of the contacts 291 and 292, which is prevented by the energized solenoid 273, as determined by the timer 268. When the timer opens, the "in" circuit is closed at the contacts 291, 292. The foot switch 259 is now closed again to energize the solenoid 239 to close the contacts 244, 245 and bring the spindle down for driving the nut that was previously inserted in the wrench. The slide at the "in" position picks up a nut for the next operation, and there is a repetition of the previously described sequence that commences with the energizing of the solenoid 239. A complete cycle for unit operation requires two closings of the foot switch 259. Provision is made for a full cycle operation by a single closing of a switch in another circuit, and this operation will now be described.

The full cycle switch is designated by the numeral 300 and embodies an actuator 301. The switch 300 is connected by conductors 302 to a gap receptacle 303. One of the terminals of the receptacle is joined by a conductor 304 into the conductor 246, and the other terminal is connected by a conductor 305 into the conductor 264.

Adjacent to the actuator 301 is an indexed or rotary fixture 306 having lugs 307 corresponding to the work positions and the fixture. As a piece of work 308 comes into position to have a nut driven thereon, the corresponding lug 307 engages the actuator 301 and closes the switch 309.

The switch arm 255 has been moved from the contact 256 to a contact 309 on the conductor 305. The conductor 246 contains a pair of contacts 310 embodied in the switch 250 which is normally open. However, the spindle is now up and closes a blade 311 against these contacts. The slide is "in," closing the switches 201 and 203, whereby the contacts 281 and 282 are bridged and the blade 254 covers a pair of contacts 312 in the switch 203. The "down" solenoid 247 of the spindle switch 181 is energized as follows: source 242, conductor 249 to blade 255, contacts 309, conductor 305, switch 300, conductor 304, switch 250, conductor 246 to switch 203, continuing in conductor 246 to solenoid 247, conductor 248 to source.

As the spindle comes down, the actuator 253 on the arm 32 closes a normally open switch 315 contained in the conductor 305 and adjustably mounted on the post 31. The switch 315 has an upwardly extending push finger 316 in the path of the member 253.

The conductor 264 contains a pair of contacts 317 embodied in the switch 250 and normally closed by a blade 318 attached to the blade 311. These contacts are now closed, since the spindle is not in the "up" position.

The "up" solenoid 265 of the spindle valve 181 is energized as follows: source 242, conductor 249, switch 255, contact 309, conductor 305 through switch 315 to conductor 284 to source. The spindle rises and closes the timer switch 261 to energize the "out" solenoid of the slide valve 196 and throw the slide forward as in the unit operation. The slide in its forward position closes the switch 207 to operate the injector as previously described.

When the timer opens, the solenoid 273 is de-energized to close the switch 290—292 and bring the slide in for another loading. The switch 203 closes. This switch being normally open, precludes a down stroke of the spindle unless the slide is fully drawn. Another closing of the switch 300 on movement of the fixture 306 introduces another cycle.

In both operations, unit operation and automatic sequence, the "down" solenoid 247 is not energized unless the switch 203 is closed. This switch closes only when the slide is fully retracted. Thus, since the switch is otherwise open, the spindle cannot descend except when the slide is fully retracted.

The wiring diagram shows an emergency device for lifting the spindle by a manual switch at any time, as when a defective piece of work is discovered under the spindle. The conductor 246 to the "down" solenoid 247 contains a pair of spaced contacts 320 normally bridged by a switch blade 321. From the switch 255 a short-circuit line 322 is extended to the switch contact 317 which is joined by conductor 264 to the "up" solenoid 265. The line 322 contains a pair of spaced contacts 323 normally unjoined but adapted to be bridged by a blade 324 movable with the blade 321. Thus, in an emergency such as described, the blades 321 and 324 are reversed from the position shown to energize the "up" solenoid 265 and de-energize the "down" solenoid 247. This unpredicted movement of the spindle interrupts the cycle but initiates a new cycle, which repeats automatically, in the manner described.

The operation of the machine may be summarized as follows:

The driving motor 84 for the spindle is started at the contactor 230 (Figure 20), and the hopper 26 is driven from the motor. The starter 230 also energizes the power circuit 233 through terminals 234, whereby the solenoid 239 is energized through the secondary transformer winding 237. Solenoid 239 closes the switch 243—245, completing a circuit through conductor 246 and solenoid 247 which brings the spindle down. As the spindle starts downward the limit switch 250 opens (Figures 20 and 22).

When the spindle reaches bottom, the foot is taken off the pedal switch 259 (Figures 1 and 20) to de-energize the solenoid 239 through the breaker 257. Switch blade 261 now closes automatically against the contacts 262 and 263, delivering current through conductors 264 to the "up" solenoid 265 of the spindle valve 181.

When the spindle reaches the top of the upstroke, the switch 266 (Figures 20 and 22) is closed by the striker 266' to close a circuit through the timer 268. The timer causes energization of solenoid 273 which closes the blade 276 across contacts 277 and 278. Current flows through switch 201 which is now closed since the slide is in the retracted position. From the terminal 281 of switch 202 current flows through conductor 282' to the "out" solenoid 283 of the slide-operating valve 196.

The slide 102 (Figure 11) advances to carry a nut to driving position below the spindle. The timer determines the dwell of the slide in the forward position and is adjustable according to the dwell interval required for driving any given nut.

At the forward position of the slide, the switch 207 is closed by the finger 213, to operate the injector solenoid 167. The plunger 168 rocks the lever 104 to elevate the injector pin 110 and drive a nut into the socket wrench 98.

When the timer opens automatically according to its adjustment, it de-energizes solenoid 273 (Figure 20) and opens the switch 276—278. This movement closes the switch 290—292. This switch is connected through contacts 295 and blade 296 to the "in" solenoid 294 of the slide-operating valve 196 (Figures 11 and 23) to retract the slide. In the fully retracted position of the slide, the pin 211 strikes the switch 201 to open the contacts 295 and thus arrest the current through solenoid 294, at the same time bridging the contacts 280, 281 to close the slide-projecting circuit momentarily.

The contacts 295 are again closed as soon as the slide starts forward, but the circuit remains open since the timer 268 holds the solenoid 273 energized and the contacts 291, 292 open.

When the timer opens, the "in" circuit is closed at contacts 291, 292 to retract the slide. The foot switch 259 is now closed to energize the solenoid 239 and close the contacts 244, 245 to bring the spindle down for driving the nut that was previously inserted in the wrench. The retracted slide picks up a nut for the next operation, and the described sequence is repeated.

Fully automatic operation independent of the pedal switch 259 is available by means of the switch 300 and actuator 301 (Figure 20). As a piece of work 308 comes into position to have a nut driven thereon, the corresponding lug 307 closes the switch 300. The spindle is now up, the slide is retracted, and the "down" solenoid 247 of the spindle switch 181 becomes energized as previously set forth in detail.

As the spindle comes down, it closes the normally open switch 315 to energize the "up" solenoid 265 of the spindle valve 181 as previously described. The elevated spindle closes the timer switch 261 to throw the slide forward as in unit operation. This movement of the slide closes the switch 207 to operate the injector.

When the timer opens, the solenoid 273 is de-energized to retract the slide for another loading. The next closing of the switch 300 by the fixture 306 introduces another cycle.

What we claim is:

1. In a nut running machine, a reciprocable spindle, a nut-holding member carried thereby, a slide adapted on its outward stroke to bring a nut into alinement with said member, a pair of cylinders for actuating said spindle and slide, a piston rod in each cylinder, said rods being connected respectively to said spindle and slide for reciprocating the same, electrically operated valves connected respectively to both ends of said cylinders, limit switches operable by said spindle in each direction thereof and operable on the valves of the spindle-operating cylinder, an adjustable timer connected to the valve that advances said slide, a normally open switch connected to said timer, switch-closing means movable with said spindle for closing the last named switch at the end of the retracting movement of said spindle, whereby to energize said timer, and an injector for transferring a nut from said slide to said nut-holding member.

2. In a nut running machine, a reciprocable spindle, a nut-holding member carried thereby, a slide adapted on its outward stroke to bring a nut into alinement with said member, a pair of cylinders for actuating said spindle and slide, a piston rod in each cylinder, said rods being connected respectively to said spindle and slide for reciprocating the same, electrically operated valves connected respectively to both ends of said cylinders, limit switches operable by said spindle in each direction thereof and operable on the valves of the spindle-operating cylinder, an adjustable timer connected to the valve that advances said slide, a normally open switch connected to said timer, switch-closing means movable with said spindle for closing the last named switch at the end of the retracting movement of said spindle, whereby to energize said timer, an injector for transferring a nut from said slide to said nut-holding member, electrical means for actuating said injector, a normally open switch for operating said electrical means, and means on said slide for closing said electrical means in the outward position of said slide.

3. In a nut running machine, a reciprocable spindle, a nut-holding member carried thereby, a slide adapted on its outward stroke to bring a nut into alinement with said member, a pair of cylinders for actuating said spindle and slide, a piston rod in each cylinder, said rods being connected respectively to said spindle and slide for reciprocating the same, electrically operated valves connected respectively to both ends of said cylinders, limit switches operable by said spindle in each direction thereof and operable on the valves of the spindle-operating cylinder, an adjustable timer connected to the valve that advances said slide, a normally open switch connected to said timer, switch-closing means movable with said spindle for closing the last named switch at the end of the retracting movement of said spindle, whereby to energize said timer, a limit switch engageable by said slide on the retracting movement thereof and connected to the valve that advances said slide, and an injector for transferring a nut from said slide to said nut-holding member.

4. In a nut running machine, a reciprocable spindle, a nut-holding member carried thereby, a slide adapted on its outward stroke to bring a nut into alinement with said member, a pair of cylinders for actuating said spindle and slide, a piston rod in each cylinder, said rods being connected respectively to said spindle and slide for reciprocating the same, electrically operated valves connected respectively to both ends of said cylinders, limit switches operable by said spindle in each direction thereof and operable on the valves of the spindle-operating cylinder, an adjustable timer connected to the valve that advances said slide, a normally open switch connected to said timer, switch-closing means movable with said spindle for closing the last named switch at the end of the retracting movement of said spindle, whereby to energize said timer, a limit switch engageable by said slide on the retracting movement thereof and connected to the valve that advances said slide, an injector for transferring a nut from said slide to said nut-holding member, electrical means for actuating said injector, a normally open switch for operating said electrical means, and means on said slide for closing said electrical means in the outward position of said slide.

5. In a nut running machine, a reciprocable spindle, a nut-holding member carried thereby, a slide adapted on its outward stroke to bring a nut into alinement with said member, a pair of cylinders for actuating said spindle and slide, a piston rod in each cylinder, said rods being connected respectively to said spindle and slide for reciprocating the same, electrically operated valves connected respectively to both ends of said cylinders, limit switches operable by said spindle in each direction thereof and operable on the valves of the spindle-operating cylinder, separate circuits for the valves in the slide-operating cylinder, a double switch in said circuits and normally closed in the slide-retracting position, an electro-magnet adapted to reverse said switch to close the slide-advancing circuit and open the slide-retracting circuit, an adjustable timer for energizing said electro-magnet, a normally open switch connected to said timer, switch-closing means movable with said spindle for closing the last named switch at the end of the retracting movement of said spindle, whereby to energize said timer, and an injector for transferring a nut from said slide to said nut-holding member.

6. In a nut running machine, a reciprocable spindle, a nut-holding member carried thereby, a slide adapted on its outward stroke to bring a nut into alinement with said member, a pair of cylinders for actuating said spindle and slide, a piston rod in each cylinder, said rods being connected respectively to said spindle and slide for reciprocating the same, electrically operated valves connected respectively to both ends of said cylinders, limit switches operable by said spindle in each direction thereof and operable on the valves of the spindle-operating cylinder, separate circuits for the valves in the slide-operating cylinder, a double switch in said circuits and normally closed in the slide-retracting position, an electro-magnet adapted to reverse said switch to close the slide-advancing circuit and open the slide-retracting circuit, an adjustable timer for energizing said electro-magnet, a normally open switch connected to said timer, switch-closing means movable with said spindle for closing the last named switch at the end of the retracting movement of said spindle, whereby to energize said timer, an injector for transferring a nut from said slide to said nut-holding member, electrical means for actuating said injector, a normally open switch for operating said electrical means, and means on said slide for closing said electrical means in the outward position of said slide.

7. A machine as defined in claim 5 further characterized by a limit switch engageable by said slide on the retracting movement thereof and connected to the valve that advances said slide.

8. A machine as defined in claim 6 further characterized by a limit switch engageable by said slide on the retracting movement thereof and connected to the valve that advances said slide.

9. In a nut running machine, a reciprocable spindle, a nut-holding member carried thereby, a slide adapted on its outward stroke to bring a nut into alinement with said member, a pair of cylinders for actuating said spindle and slide, a piston rod in each cylinder, said rods being connected respectively to said spindle and slide for reciprocating the same, electrically operated valves connected respectively to both ends of said cylinders, limit switches operable by said spindle in each direction thereof and operable on the valves of the spindle-operating cylinder, separate circuits for the valves in the spindle-moving cylinder, a double switch in said circuits, the limit switch in the spindle-raising circuit being normally closed and the limit switch in the spindle-lowering circuit being normally open, the last named switch being operable by said spindle in its upper position, the limit switch in the spindle-raising circuit being operable by said spindle in lower position, an adjustable timer connected to the valve that advances said slide, a normally open switch connected to said timer, switch-closing means movable with said spindle for closing the last named switch at the end of the retracting movement of said spindle, whereby to energize said timer, and an injector for transferring a nut from said slide to said nut-holding member.

10. A machine as defined in claim 9 further characterized by electrical means for actuating said injector, a normally open switch for operating said electrical means, and means on said slide for closing said electrical means in the outward position of said slide.

11. A machine as defined in claim 9, further characterized by a limit switch engageable by said slide on the retracting movement thereof and connected to the valve that advances said slide.

12. In a nut running machine, a reciprocable spindle, a nut-holding member carried thereby, a slide adapted on its outward stroke to bring a nut into alinement with said member, a pair of cylinders for actuating said spindle and slide, a piston rod in each cylinder, said rods being connected respectively to said spindle and slide for reciprocating the same, electrically operated valves connected respectively to both ends of said cylinders, limit switches operable by said spindle in each direction thereof and operable on the valves of the spindle-operating cylinder, separate circuits for the valves in the spindle-moving cylinder, a double switch in said circuits, the switch in the spindle-raising circuit being normally closed and the switch in the spindle-lowering circuit being normally open, the last named switch being operable by said spindle in its upper position, the limit switch in the spindle-raising circuit being operable by said spindle in lower position, separate circuits for the valves in the slide-operating cylinder, a double switch in said circuits and normally closed in the slide-retracting position, an electro-magnet adapted to reverse said switch to close the slide-advancing circuit and open the slide-retracting circuit, an adjustable timer for energizing said electro-magnet, a normally open switch connected to said timer, switch-closing means movable with said spindle for closing the last named switch at the end of the retracting movement of said spindle, whereby to energize the timer, and an injector for transferring a nut from said slide to said nut-holding member.

13. A machine as defined in claim 12, further characterized by electrical means for actuating said injector, a normally open switch for operating said electrical means, and means on said slide for closing said electrical means in the outward position of said slide.

14. A machine as defined in claim 12, further characterized by a limit switch engageable by said slide on the retracting movement thereof and connected to the valve that advances said slide.

ROY W. BAILEY.
JOHN T. FAULL.

REFERENCES CITED

The following references are of record in the file of this patent:

UNITED STATES PATENTS

| Number | Name | Date |
|---|---|---|
| 1,918,557 | Pfeiffer | July 18, 1933 |
| 2,337,667 | Kuehlman | Dec. 28, 1943 |
| 2,509,123 | Bailey et al. | May 23, 1950 |